United States Patent
Tait

[19]

[11] Patent Number: 6,129,269
[45] Date of Patent: Oct. 10, 2000

[54] EASY-OPENING REUSABLE ENVELOPES

[75] Inventor: John C Tait, North Balwyn, Australia

[73] Assignee: Rexam Australia Pty Limited, Notting Hill, Australia

[21] Appl. No.: 09/242,569

[22] PCT Filed: Aug. 29, 1997

[86] PCT No.: PCT/AU97/00561

§ 371 Date: Feb. 19, 1999

§ 102(e) Date: Feb. 19, 1999

[87] PCT Pub. No.: WO98/08744

PCT Pub. Date: Mar. 5, 1998

[30] Foreign Application Priority Data

Aug. 29, 1996 [AU] Australia ................................ PO2004
Sep. 16, 1996 [AU] Australia ................................ PO2354

[51] Int. Cl.[7] .................................................. B65D 27/06
[52] U.S. Cl. .......................... 229/301; 229/303; 229/309; 229/316
[58] Field of Search .................................. 229/301, 307, 229/309, 311, 312, 313, 316, 303

[56] References Cited

U.S. PATENT DOCUMENTS

| | | |
|---|---|---|
| 1,433,653 | 10/1922 | Rabb ........................................ 229/312 |
| 2,402,821 | 6/1946 | Kosteling . |
| 2,673,680 | 3/1954 | Deutschmeister et al. . |
| 2,681,175 | 6/1954 | David . |
| 2,759,658 | 8/1956 | Sawdon . |
| 2,964,233 | 12/1960 | McFarland . |
| 3,111,257 | 11/1963 | Peach . |
| 3,143,280 | 8/1964 | Hiersteiner . |
| 3,270,948 | 9/1966 | Donovan . |
| 3,360,184 | 12/1967 | Greason . |
| 4,190,162 | 2/1980 | Buescher . |
| 4,334,618 | 6/1982 | Buescher . |
| 4,403,696 | 9/1983 | Newell . |
| 4,563,317 | 1/1986 | Kranz . |

(List continued on next page.)

FOREIGN PATENT DOCUMENTS

| | | |
|---|---|---|
| 234035 | 2/1960 | Australia . |
| 93521 | 9/1986 | Australia . |
| 99222 | 1/1988 | Australia . |
| 44746/93 | 2/1994 | Australia . |
| 120967 | 7/1994 | Australia . |
| 79004/94 | 6/1995 | Australia . |

(List continued on next page.)

OTHER PUBLICATIONS

Leslie Martin, et al., PCT Publication No. WO 96/21593, "Reusable Envelopes", Jul. 18, 1996.

*Primary Examiner*—Jes F. Pascua
*Attorney, Agent, or Firm*—Lyon & Lyon LLP

[57] ABSTRACT

A two-panel easy-opening reusable envelope for use in an outward journey from a sender to a receiver followed by a return journey from the receiver to the sender or some other person includes a first panel, a second panel, and a reuse flap, the reuse flap being connected to the first panel along a first foldline. The reuse flap has a free outer edge and a first attachment portion for sealing the envelope during the outward journey, a second attachment portion for sealing the envelope during the return journey, and means enabling separation of the first attachment portion and the second attachment portion. The reuse flap includes a first adhesive strip located on one of the second panel and the first attachment portion between the means enabling separation and the outer edge of the reuse flap for sealing the reuse flap to the second panel before the outward journey of the envelope. The reuse flap also has a receiver-activated adhesive strip located on one of the second panel and the second attachment portion between the means enabling separation and the first foldline for allowing the receiver to reseal the reuse flap to the second panel before reusing the envelope. One of the first and second panels of the envelope includes return address means for displaying a return address on the second panel such that the return address is upside down in relation to a first address located on the first panel.

25 Claims, 4 Drawing Sheets

U.S. PATENT DOCUMENTS

| | | |
|---|---|---|
| 4,993,624 | 2/1991 | Schlich . |
| 5,169,061 | 12/1992 | Buescher . |
| 5,207,373 | 5/1993 | Tighe . |
| 5,232,150 | 8/1993 | Solomons . |
| 5,251,810 | 10/1993 | Kim . |
| 5,277,362 | 1/1994 | Wilson . |
| 5,285,958 | 2/1994 | Buescher . |
| 5,503,328 | 4/1996 | Rocaforte et al. ................... 229/313 X |
| 5,570,835 | 11/1996 | Sung et al. .......................... 229/313 X |

FOREIGN PATENT DOCUMENTS

| | | |
|---|---|---|
| 37938/95 | 1/1996 | Australia . |
| 40455/95 | 7/1996 | Australia . |
| 1048674 | 12/1953 | France ..................................... 229/316 |
| 691075 | 6/1965 | Italy ....................................... 229/301 |
| 2 292 556 | 2/1996 | United Kingdom . |
| 93/19991 | 10/1993 | WIPO ..................................... 229/311 |
| WO 85/03039 | 7/1995 | WIPO . |
| WO 96/21598 | 7/1996 | WIPO . |
| WO 98/08744 | 3/1998 | WIPO . |

EASY-OPENING REUSABLE ENVELOPES

FIELD OF THE INVENTION

The invention relates to easy-opening reusable envelopes, and particularly to such envelopes made from paper or card.

BACKGROUND OF THE INVENTION

Easy-opening envelopes are known which comprise a plastics strip adhered to the inside of the envelope along one of the foldlines thereof. One or more perforations are provided in the material of the envelope at one end of the plastics strip to allow the user to tear the envelope in order to grasp one end of the plastics strip. The plastics strip is then pulled so as to tear along one of the foldlines of the envelope, thus opening the envelope and allowing its contents to be removed.

Reusable envelopes with which the invention is concerned allow a first person (the sender) to send the envelope on an outward journey to a second person (the receiver), who is able to open the envelope, examine the contents, insert new contents, reseal the envelope, and return the envelope on a return journey to the sender, or to some other address.

Reusable envelopes are also known in which one of the flaps (a reuse flap) of the envelope is loosely secured by two or three gum spots in a closed position, under the rear panel of the envelope and also provided with a moistenable adhesive for resealing the flap. When the envelope is received, the receiver is able to break the gum spots which loosely secure the reuse flap in order to remove the contents of the envelope, before moistening the moistenable adhesive and resealing the reuse flap to the outer surface of the rear panel of the envelope.

However, such a reusable envelope suffers from the disadvantage that the gum spots often do not provide a particularly secure closure for the reuse flap on the outward journey of the envelope. It is thus possible for the gum spots to break, and for the contents of the envelope to be lost. It is also possible for tampering with the contents of the envelope to occur. If a party breaks the gum spots, looks at the contents of the envelope and subsequently reseals the reuse flap using new gum spots, the receiver of the envelope may not be aware that the contents of the envelope have been tampered with.

SUMMARY OF THE INVENTION

The invention seeks to provide an envelope which is both reusable and easy-opening, and which provides a higher degree of tamper resistance than the prior art reusable envelopes described above.

According to the invention there is provided a two panel easy-opening reusable envelope for use in an outward journey from a sender to a receiver followed by a return journey from the receiver to the sender or some other person, the envelope comprising a first panel, a second panel, and a reuse flap, the reuse flap being connected to the first panel along a first foldline, the reuse flap having a free outer edge, the reuse flap comprising a first attachment portion for sealing said envelope during the outward journey, a second attachment portion for sealing said envelope during the return journey, and means enabling separation of said first attachment portion and said second attachment portion, wherein said reuse flap further comprises:

a first adhesive strip located on one or other of said second panel and said first attachment portion between said means enabling separation and the outer edge of the reuse flap for sealing the reuse flap to the second panel before the outward journey of the envelope, and a receiver-activated adhesive strip located on one or other of said second panel and said second attachment portion between said means enabling separation and said first foldline for allowing the receiver to reseal the reuse flap to the second panel before reusing the envelope.

Preferably, said receiver-activated adhesive strip is located on said second attachment portion.

Preferably, said second adhesive strip is located on said first attachment portion.

Preferably, said second adhesive strip is a permanent adhesive strip to enable the first attachment portion of the reuse flap to remain permanently attached to the second panel after the receiver has opened the envelope using the means enabling separation of the first and second attachment portions.

In a further preferred embodiment, said means enabling separation of said first attachment portion and said second attachment portion comprises a line of weakness extending along the reuse flap spaced from said first foldline, said line of weakness being adapted for allowing the receiver to tear the reuse flap along the line of weakness to open the envelope.

Preferably, said line of weakness comprises a line of perforations through the reuse flap.

Preferably, the line of weakness comprises a pair of parallel lines of perforations through the reuse flap.

Preferably, the line of weakness comprises an opening strip adhered to the reuse flap adapted to be torn through the reuse flap by the receiver in order to open the envelope.

Preferably, said means enabling separation comprises two lines of weakness extending along the reuse flap to form a perforated strip for allowing the receiver to tear along the lines of weakliness to open the envelope.

In a preferred embodiment, said means enabling separation of said first attachment portion and said second attachment portion comprises an opening strip adhered to the reuse flap away from the first foldline, said opening strip being adapted to be torn through the reuse flap to open the envelope.

Preferably, the envelope further comprises a closure flap attached to the first panel along a second foldline, the closure flap being provided with adhesive and being adapted to remain adhered to the second panel to seal the envelope.

Preferably, said adhesive is a permanent adhesive to adhere the closure flap to the second panel permanently once the contents of the envelope have been inserted in the envelope.

Preferably, the second panel has an outer surface, and said reuse flap is one of two side flaps of the envelope, both side flaps being adapted to be adhered to the outer surface of the second panel.

Preferably, the reuse flap is provided with a cut-away portion in a region where the reuse flap overlaps, or would overlap in the absence of the cut-away portion overlap, with the closure flap.

Preferably, one of said first and second panels of the envelope is provided with return address means.

Preferably, said envelope further comprises return postage means.

Preferably, the return address means comprises a preprinted return address on said one of said panels of the envelope.

Preferably, said return address means is adapted for displaying a return address on said second panel such that said return address is upside down in relation to a first address located on said first panel.

Preferably, said return address means comprises return address indication means for directing the receiver to place a return address on said one of said first or second panels.

Preferably, said return address means comprises a transparent window in said one of said first or second panels through which a return address can be made visible before reusing the envelope.

Preferably, said envelope further comprises return postage indication means comprising stamp affixment indication means for indicating to the receiver that a stamp should be attached to one of said first or second panels.

Preferably, said stamp affixment indication means comprises a pre-paid return postage indication on said one of said first or second panels.

Preferably, the reuse flap is provided with a scoreline which extends along an edge of the means for separating the first and second attachment portions adjacent said first foldline for assisting in enabling said means for separating said first and second attachment portions to tear clearly through the reuse flap.

Preferably, the reuse flap comprises a slit or perforation at one end of the means for separating the first and second attachment portions for facilitating commencement opening of the envelope.

Preferably, said envelope further comprises a strip indication means at one end of the means for separating the first and second attachment portions for indicating to the receiver the point at which the means at one end of the means for separating the first and second attachment portions should be grasped to open the envelope.

Preferably, said strip indication means comprises a coloured region of the reuse flap.

Preferably, the envelope having a bottom edge and a top edge, wherein the reuse flap is provided along a side of the envelope, the means for separating the first and second attachment portions being adapted to be grasped adjacent the bottom edge of the envelope and to tear along the reuse flap towards the top edge of the envelope. This is particularly convenient where the envelope has a closure flap at the top of the envelope and there is some overlap between the closure and reuse flaps, which would make starting at the top of the envelope difficult.

BRIEF DESCRIPTION OF THE DRAWINGS

A specific embodiment of the invention will now be described, by way of example only, with reference to the accompanying drawings, in which.

DETAILED DESCRIPTION OF THE PREFERRED EMBODIMENTS

Figure 1:
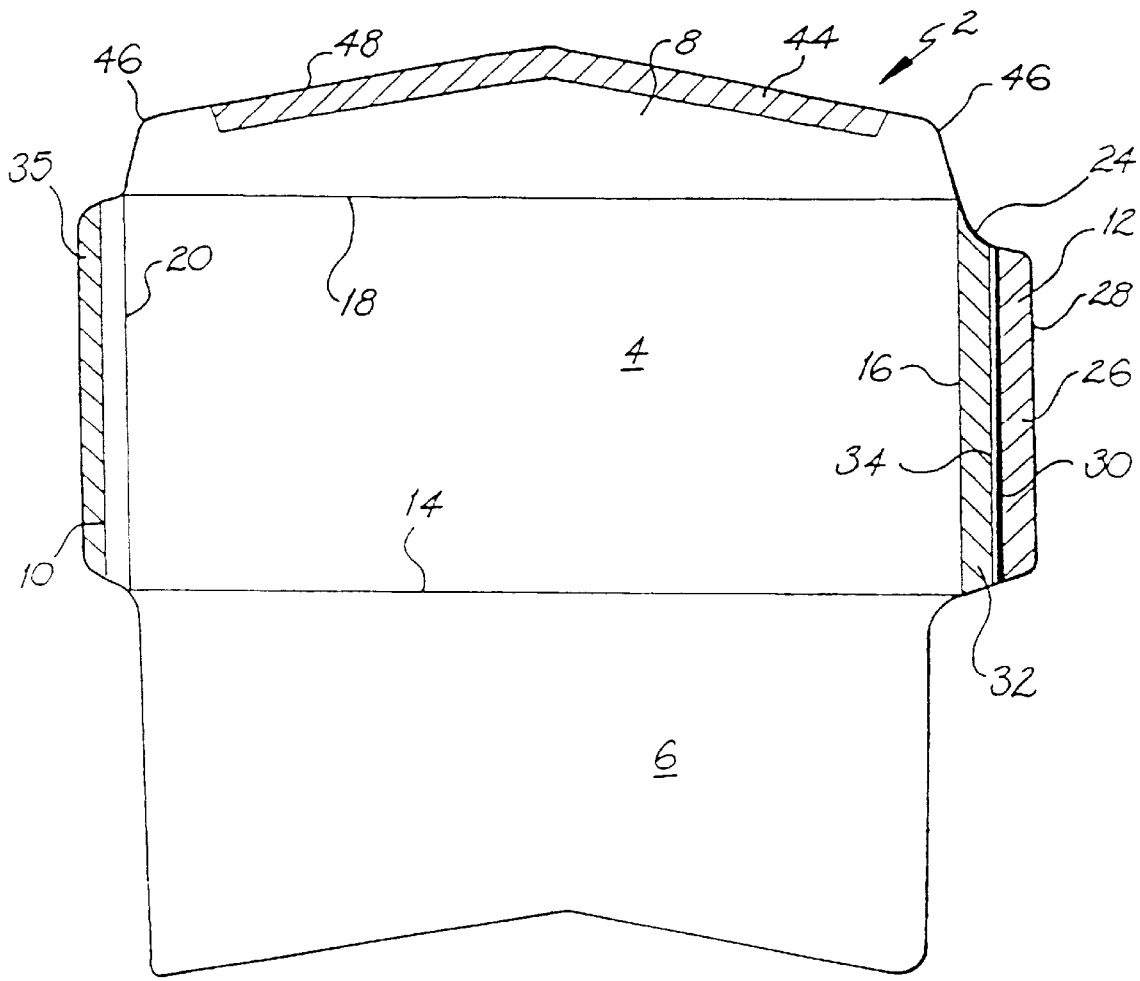
FIG. 1 shows the blank of an easy-opening reusable envelope.

The paper envelope blank 2 shown in FIG. 1 comprises a front panel 4, a rear panel 6, a closure flap 8, a side flap 10 and a reuse flap 12. The rear panel 6, closure flap 8, side flap 10 and reuse flap 12 are all integrally formed with the front panel 4, and connected thereto along foldlines 14, 16, 18 and 20 respectively.

Figure 2:
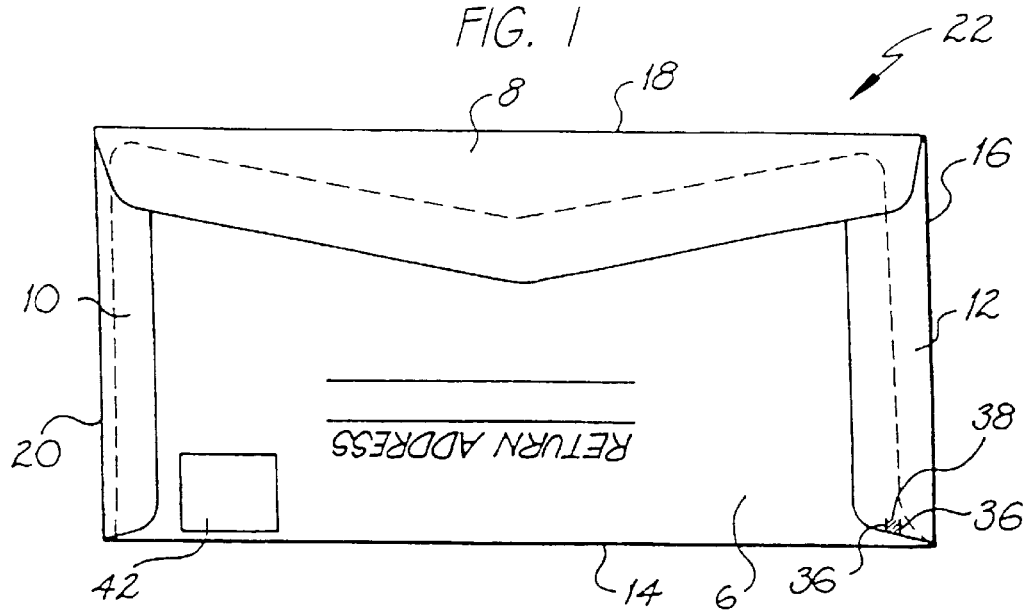
FIG. 2 shows an easy-opening reusable envelope formed from the blank of FIG. 1.

As shown in FIG. 2, the easy-opening reusable envelope 22 is formed by first folding the rear panel 6 over the front panel 4, then folding the side flap 10 and reuse flap 12 over the rear panel 6 and adhering thereto, and finally folding the closure flap 8 over the rear panel 6. The side flap 10 and reuse flap 12 are therefore located on the outside of the envelope.

The structure of the reuse flap 12 shown in FIGS. 1 to 3 will now be described. The reuse flap 12 comprises a first attachment portion 13 and a second attachment portion 15 and is provided with a cut-away region 24 adapted to prevent, or at least reduce, overlap between the reuse flap 12 and the closure flap 8. The reuse flap 12 is also broader than the side flap 10, which allows the reuse flap to accommodate: an adhesive strip 26 which is preferably a permanently adhesive strip, located adjacent the outer edge 28 of the reuse flap 12; a plastics opening strip 30, adhered along the centre of the reuse flap 12; a score line 34 extending along the inner edge of the opening strip 30; and a receiver-activated adhesive strip 32 located between the score line 34 and the reuse flap foldline 16.

The adhesive strip 26 covers the whole of the region of the reuse flap 12 between the outer edge 28 thereof and the plastics strip 30, and is adapted to adhere the reuse flap 12, preferably permanently, to the rear panel 6 when the envelope is assembled before its outward journey, as shown in FIG. 2.

The side flap 10 is provided with an adhesive strip 35 preferably for permanently adhering the side flap 10 to the rear flap 6 when the envelope is assembled before its outward journey.

The closure flap 8, which is closed and sealed by the sender after inserting the contents of the envelope, is provided with a sender-activated adhesive strip 44 in conventional fashion. It should be noted that the adhesive strip 44 does not extend all the way to the ends 46 of the outer edge 48 of the closure flap 8. This ensures that some slight amount of overlap between the reuse flap 12 and closure flap 8 does not create a difficulty in the operation of the reuse flap 12.

As shown in FIG. 2, two small slits 36 are provided on either side of the bottom of the opening strip 30 for facilitating commencement of the tearing process. In addition, a small region of red ink 38 is provided between the two slits 36 in order to indicate to the receiver that the envelope should be opened at this point. In order to open the envelope, the receiver grasps the bottom of the reuse flap 12 between the two slits 36, and pulls upwardly in order to tear the opening strip 30 upwards along the whole length of the reuse flap 12. The score line 34 (which is an indentation in the inner surface of the reuse flap 12 formed in any suitable manner, such as drawing a sharp wheel along the reuse flap 12, ensures that the opening strip 30 tears cleanly through the reuse flap 12) at least on the side of the opening strip 30 at which the score line 34 is provided. If necessary, two such score lines can be provided, one on either side of the opening strip 30.

Once the receiver has opened the envelope as described above, the contents can be removed, and return contents placed inside the envelope. The envelope can then be reused by folding the (remains of) the reuse flap along foldline 16, and adhering the (remains of) the reuse flap 12 to the rear panel 6 using the receiver-activated adhesive strip 32. The adhesive strip 32 can be of any suitable form, including a moistenable gum, or an adhesive strip provided with a peel-away protective layer (not shown).

Figure 5:
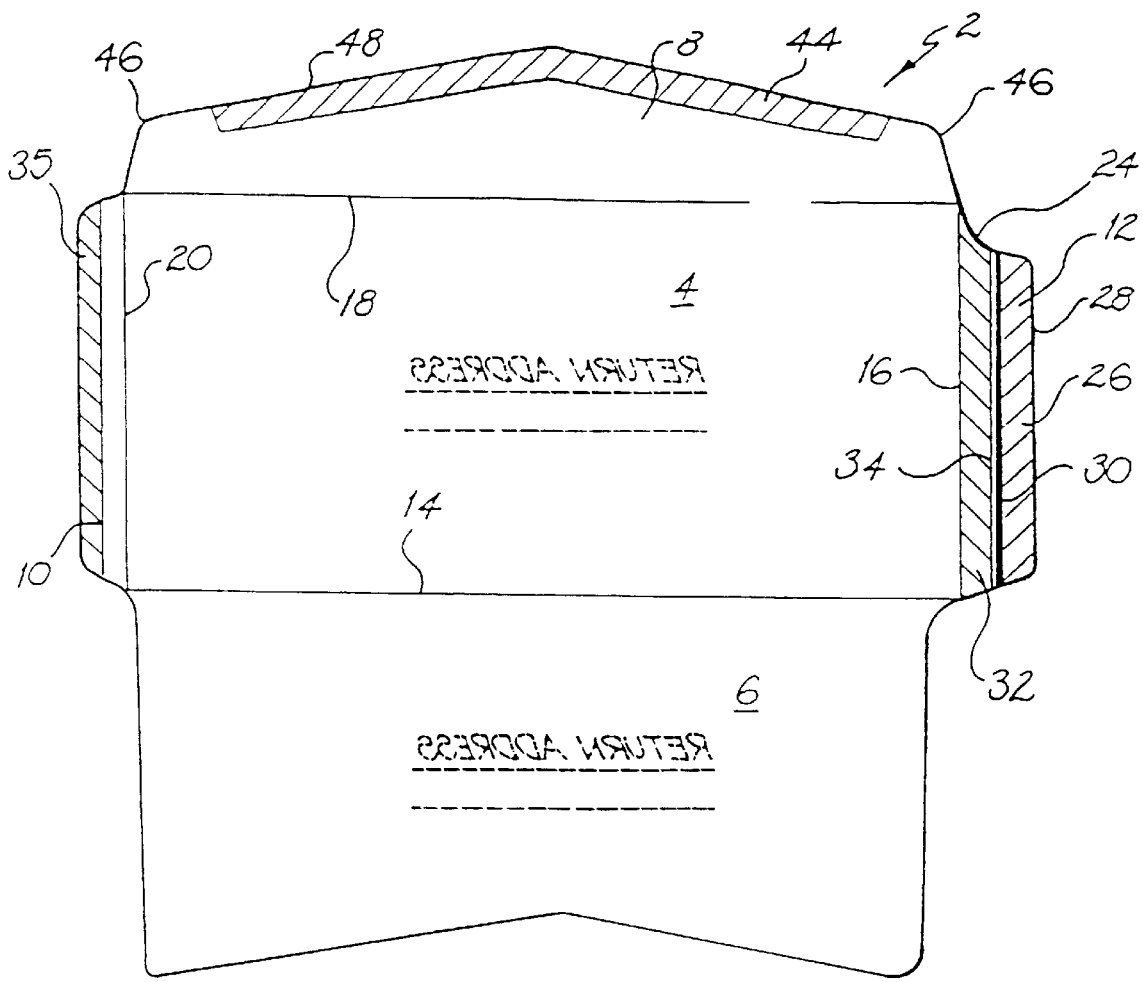
FIG. 5 shows the blank of an easy-opening envelope having a return address in upside down relation to a first address, the addresses being illustrated in phantom to indicate that they are printed on the reverse side of the panels shown.

In the embodiment shown in FIG. 2, a return address 40 is provided on the outer surface of the rear panel 6, in an orientation which is upside down relative to the receiver's address printed on the front panel 4 of the envelope as shown in FIG. 5. This ensures that the envelope returns through the postal system in an orientation which is upside down relative to that in which it was delivered to the receiver, and this ensures that any machine readable codes which were placed on the envelope on its outward journey, typically along the bottom of the front panel 4, do not interfere with the return journey. In this regard, it should be noted that the machine readable code reading equipment of some postal services actually reads through the paper of the envelope and is therefore able to (erroneously) read codes on the other side of the envelope, thus causing confusion. By ensuring that the envelope is in an upside down orientation on its return journey, such confusion is avoided.

Figure 6:
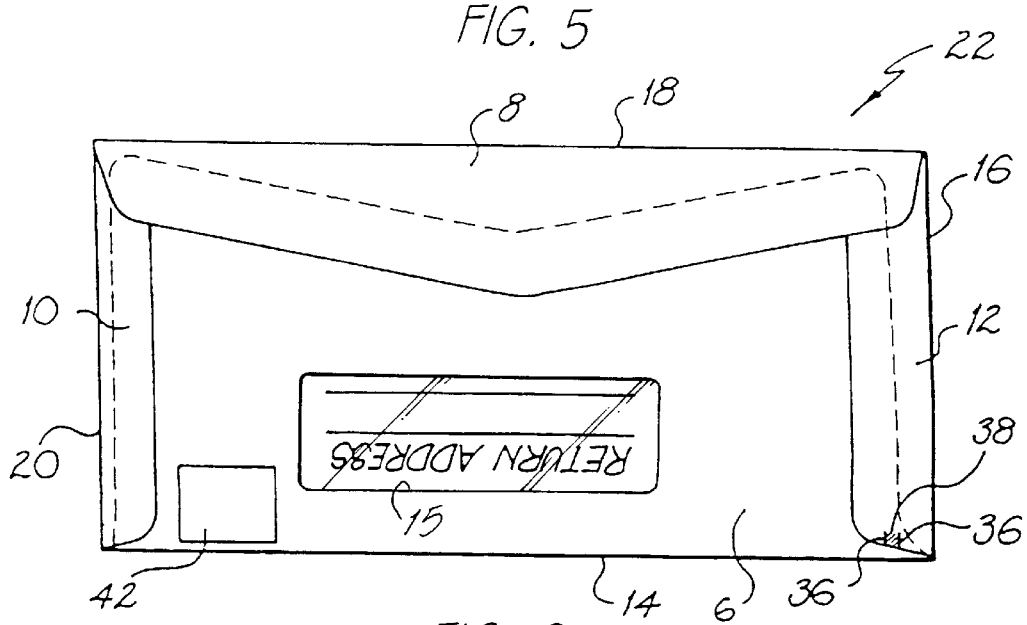
FIG. 6 shows an easy-opening reusable envelope having a transparent window through which a return address is visible.
Figure 7:
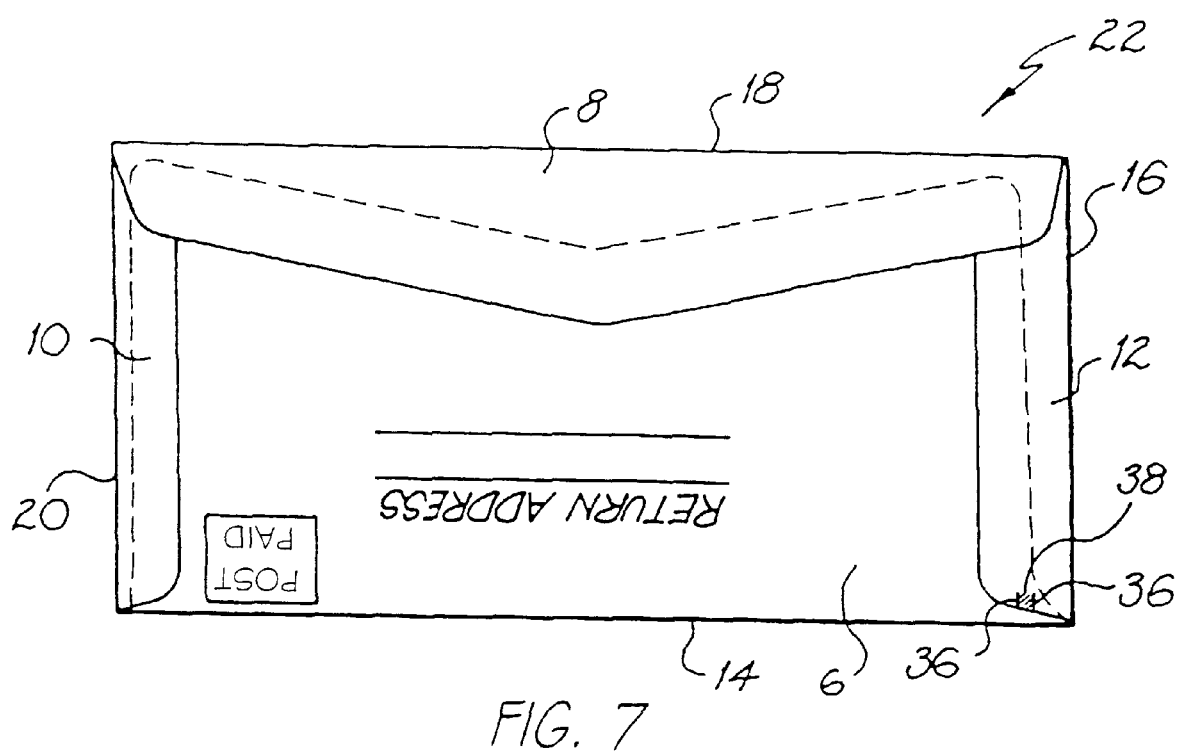
FIG. 7 shows an easy-opening reusable envelope having a pre-paid return postage indication.

A stamp affixment indication box 42 is also printed on the rear panel 6 in order to indicate the location at which the receiver should affix a postal stamp for the return journey of the envelope. In an alternative embodiment shown in FIG. 7, a pre-paid return postage indication may be included on one of the first or second panels. Also, as shown in FIG. 6, a transparent window 15 may be formed in one of the first or second panels through which a return address may be visible before reusing the envelope.

Figure 3:
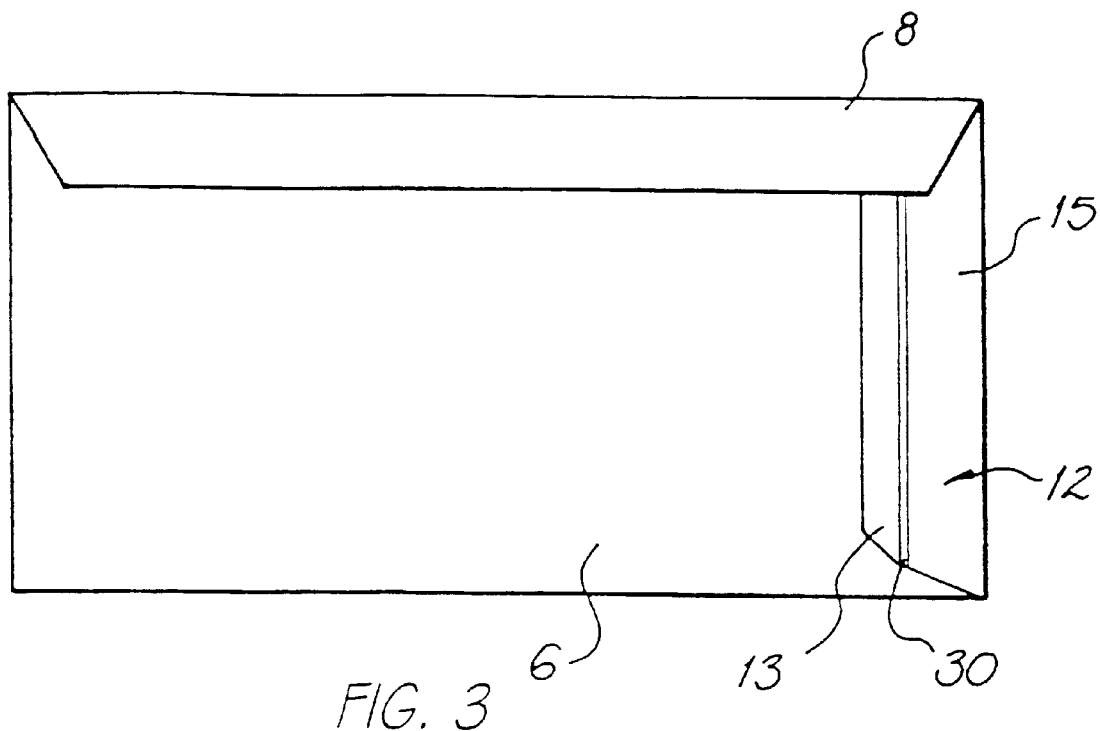
FIG. 3 shows an easy-opening reusable envelope having a tape opening strip.
Figure 4:
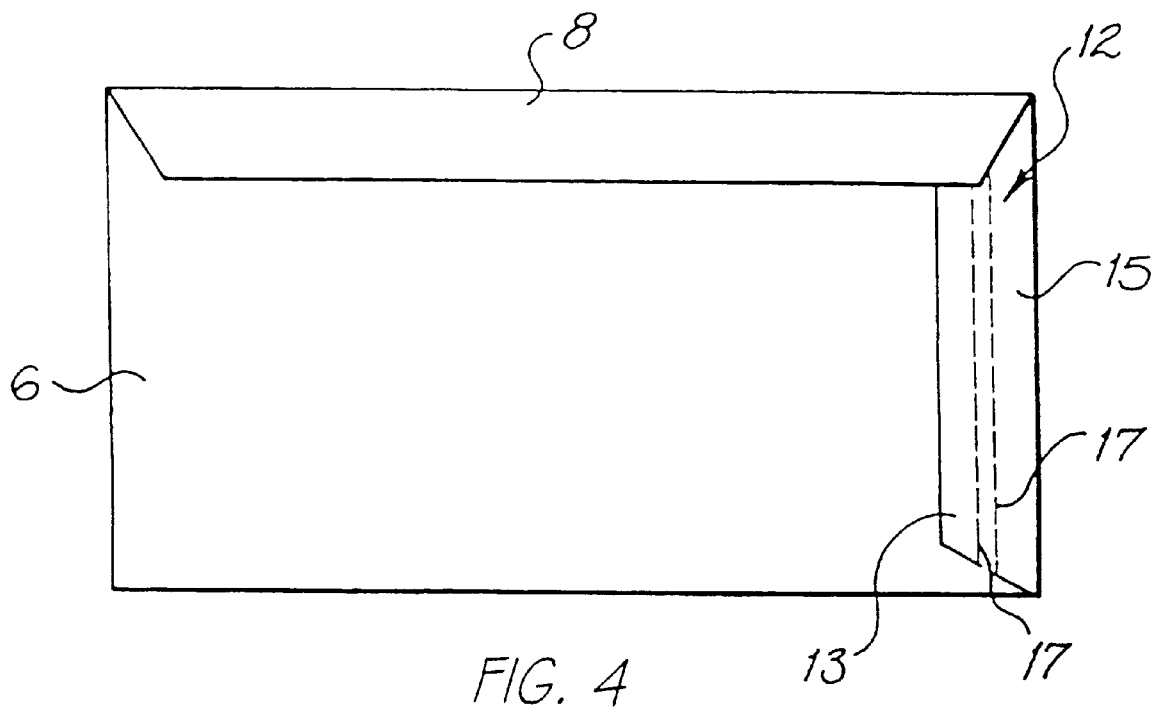
FIG. 4 shows an easy-opening reusable envelope having a tear-out perforated opening strip.

The plastics opening strip 30, shown in the representations of the envelope in FIGS. 1 to 3 may be replaced by one or more perforated lines 17, as shown in FIG. 4, or the plastics opening strip 30 may be provided in combination with one or more perforated lines 17.

It should be noted that modifications to the described embodiment are possible without departing from the scope of the invention. For example, the reuse flap 12 need not be located at the side of the envelope, and could, for example, extend along the top of the envelope, in place of the closure flap 8. In this case, the permanent strip 26 would be activated by the sender before sealing the envelope.

What is claimed is:

1. A two-panel easy-opening reusable envelope for use in an outward journey from a sender to a receiver followed by a return journey from the receiver to the sender or some other person, the envelope comprising a first panel, a second panel, and a reuse flap, the reuse flap being connected to the first panel along a first foldline, the reuse flap having a free outer edge, the reuse flap comprising a first attachment portion for sealing said envelope during the outward journey, a second attachment portion for sealing said envelope during the return journey, and means enabling separation of said first attachment portion and said second attachment portion, wherein said reuse flap further comprises:

a first adhesive strip located on one or other of said second panel and said first attachment portion between said means enabling separation and the outer edge of the reuse flap for sealing the reuse flap to the second panel before the outward journey of the envelope, and a receiver-activated adhesive strip located on one or other of said second panel and said second attachment portion between said means enabling separation and said first foldline for allowing the receiver to reseal the reuse flap to the second panel before reusing the envelope, wherein one of said first and second panels of the envelope is provided with return address means, said return address means being adapted for displaying a return address on said second panel such that said return address is upside down in relation to a first address located on said first panel.

2. An envelope according to claim 1, wherein said receiver-activated adhesive strip is located on said second attachment portion.

3. An envelope according to claim 1, wherein said first adhesive strip is located on said first attachment portion.

4. An envelope according to claim 1, wherein said first adhesive strip is a permanent adhesive strip to enable the first attachment portion of the reuse flap to remain permanently attached to the second panel after the receiver has opened the envelope using the means enabling separation of the first and second attachment portions.

5. An envelope according to claim 1, wherein said means enabling separation of said first attachment portion and said second attachment portion comprises a line of weakness extending along the reuse flap spaced from said first foldline, said line of weakness being adapted for allowing the receiver to tear the reuse flap along the line of weakness to open the envelope.

6. An envelope according to claim 5, wherein said line of weakness comprises a line of perforations through the reuse flap.

7. An envelope according to claim 5, wherein the line of weakness comprises a pair of parallel lines of perforations through the reuse flap.

8. An envelope according to claim 5, wherein the line of weakness comprises an opening strip adhered to the reuse flap adapted to be torn through the reuse flap by the receiver in order to open the envelope.

9. An envelope according to claim 1, wherein said means enabling separation comprises two lines of weakness extending along the reuse flap to form a perforated strip for allowing the receiver to tear along the lines of weakness to open the envelope.

10. An envelope according to claim 1, wherein said means enabling separation of said first attachment portion and said second attachment portion comprises an opening strip adhered to the reuse flap away from the first foldline, said opening strip being adapted to be torn through the reuse flap to open the envelope.

11. An envelope according to claim 1, wherein the envelope further comprises a closure flap attached to the first panel along a second foldline, the closure flap being provided with adhesive and being adapted to remain adhered to the second panel to seal the envelope.

12. An envelope according to claim 11, wherein said adhesive is a permanent adhesive to adhere the closure flap to the second panel permanently once the contents of the envelope have been inserted in the envelope.

13. An envelope according to claim 1, wherein the second panel has an outer surface, and said reuse flap is one of two side flaps of the envelope, both side flaps being adapted to be adhered to the outer surface of the second panel.

14. An envelope according to claim 1, wherein the reuse flap is provided with a cut-away portion in a region where the reuse flap overlaps, or would overlap in the absence of the cut-away portion, with a closure flap.

15. An envelope according to claim 1, wherein said envelope further comprises return postage means.

16. An envelope according to claim 1, wherein the return address means comprises a pre-printed return address on said one of said panels of the envelope.

17. An envelope according to claim 1, wherein said return address means comprises return address indication means for directing the receiver to place a return address on said one of said first or second panels.

18. An envelope according to claim 1, wherein said return address means comprises a transparent window in said one of said first or second panels through which a return address can be made visible before reusing the envelope.

19. An envelope according to claim 1, wherein said envelope further comprises return postage indication means comprising stamp affixment indication means for indicating to the receiver that a stamp should be attached to one of said first or second panels.

20. An envelope according to claim 19, wherein said stamp affixment indication means comprises a pre-paid return postage indication on said one of said first or second panels.

21. An envelope according to claim 1, wherein the reuse flap is provided with a scoreline which extends alone an edge of the means for separating the first and second attachment portions adjacent said first foldline for assisting in enabling said means for separating said first and second attachment portions to tear clearly through the reuse flap.

22. An envelope according to claim 1, wherein the reuse flap comprises a slit or perforation at one end of the means for separating the first and second attachment portions for facilitating commencement opening of the envelope.

23. An envelope according to claim 1, wherein said envelope further comprises a strip indication means at one end of the means for separating the first and second attachment portions for indicating to the receiver the point at which the means at one end of the means for separating the first and second attachment portions should be grasped to open the envelope.

24. An envelope according to claim 23, wherein said strip indication means comprises a coloured region of the reuse flap.

25. An envelope according to claim 1, the envelope having a bottom edge and a top edge, wherein the reuse flap is provided along a side of the envelope, the means for separating the first and second attachment portions being adapted to be grasped adjacent the bottom edge of the envelope and to tear along the reuse flap towards the top edge of the envelope.

* * * * *